United States Patent [19]

Rea

[11] Patent Number: 4,645,561
[45] Date of Patent: Feb. 24, 1987

[54] METAL-POLISHING COMPOSITION AND PROCESS

[75] Inventor: William V. Rea, Toledo, Oreg.

[73] Assignee: Ampex Corporation, Redwood City, Calif.

[21] Appl. No.: 816,592

[22] Filed: Jan. 6, 1986

[51] Int. Cl.$^4$ .......................... B44C 1/22; B24B 1/00; B24B 7/19; B24D 3/02
[52] U.S. Cl. ................................. 156/636; 51/281 R; 51/309; 156/153; 156/645; 156/903
[58] Field of Search ............... 156/153, 154, 636, 645, 156/644, 903; 51/281 R, 316, 320, 293–295, 309; 252/79.2

[56] References Cited

U.S. PATENT DOCUMENTS

| | | |
|---|---|---|
| 3,342,652 | 9/1967 | Reisman et al. .................... 156/636 |
| 4,011,099 | 3/1977 | Gutsche ................................ 134/7 |
| 4,305,779 | 12/1981 | Steeves et al. ....................... 156/636 |
| 4,412,886 | 11/1983 | Sakaguchi et al. ................. 156/645 |
| 4,475,981 | 10/1984 | Rea ...................................... 156/636 |

Primary Examiner—William A. Powell
Attorney, Agent, or Firm—Thomas E. Ciotti; Ralph L. Mossino; Joel D. Talcott

[57] ABSTRACT

The working surfaces of nickel-coated substrates for rigid magnetic discs are polished in a single-step process that employs a polishing composition comprising an aqueous suspension of unlubricated aluminum oxide powder having a hexagonal crystal shape and a nominal particle size of 1 to 10 microns, and colloidal aluminum oxide.

11 Claims, No Drawings

METAL-POLISHING COMPOSITION AND PROCESS

This invention is in the field of metal polishing. More particularly it relates to a composition and process that is especially adapted for polishing a nickel- or nickel alloy-coated surface such as the surface of a substrate to which a ferromagnetic layer is applied in the manufacture of rigid magnetic discs.

Rigid magnetic discs are conventionally made of aluminum substrates or blanks to which are applied a nonmagnetic layer of nickel or nickel alloy followed by a magnetic layer of a ferromagnetic layer. Various deposition techniques are used to apply the nickel and magnetic layers including electroless plating, electroplating, and sputtering or vapor deposition. In electroless plating of nickel a continuous film of nickel is deposited on the surface of the blank by the interaction in solution of a nickel salt and a chemical reducing agent. The bath used in the plating contains the nickel salt and the reducing agent and may also contain other additives such as stabilizers, buffers, complexing agents, and the like. The resultant nickel coating is nonmagnetic, amorphous, and hard. The surface of the nickel or nickel alloy is, however, rough and nonuniform and must be smoothed before the magnetic layer is applied in order for the disc to function properly.

Various grinding and polishing procedures have been used previously to smooth the nickel surface on disc substrates. Commonly owned U.S. Pat. No. 4,475,981 describes a two-step polishing process that involves both chemical and mechanical action. It uses a polishing composition comprising a mixture of an aqueous suspension of >1 micron aluminum oxide powder containing sodium hypochlorite and an aqueous suspension of colloidal aluminum oxide. In the first step of the process the nickel coated substrate is rough polished with the aluminum oxide suspension. In the second step, the colloidal aluminum oxide suspension is added with continued polishing. The addition of the colloidal aluminum oxide changes the pH of the mixture, causing liberation of chlorine which chemically attacks the substrate surface. While this prior polishing process is effective, it has several drawbacks. First, it is not capable of high surface removal rate in terms of both the amount of surface removed and the speed of removal. The process, therefore, is not practical for polishing inferior quality nickel coatings that tend to be rougher and require more polishing. The inability to polish such coatings lowers the overall yield of the substrate finishing procedure. Second, its two-step nature is time-consuming and limits machine capacity.

The main object of the present invention is to provide a single step polishing process that is capable of high surface removal rates. This was accomplished by eliminating sodium hypochlorite from the prior polishing composition, using an unlubricated aluminum oxide powder of nominal particle size in the range of 1 to 10 microns (rather than the 0.3 micron powder used previously), and carrying out the process in a single step. The resulting process not only gives increased yields and increased machine productivity, but also reduces polishing materials cost and yields a polished substrate with better surface finish.

The improved polishing composition of the invention is an aqueous suspension of unlubricated aluminum oxide powder having a hexagonal crystal shape and a nominal particle size in the range of 1 to 10 microns, preferably 3 to 5 microns, and colloidal aluminum oxide.

The aluminum oxide powder is present in the suspension at a concentration of about 1% to about 5% by volume, preferably about 2% to 4% by volume. An untreated blend of aluminum oxide powder (Dry Pack or Mem Disk polish, Rhodes Corp./Universal Products, nominal particle size 3–5 microns), is a preferred type of aluminum oxide powder. This preferred type of aluminum oxide powder was found to provide faster removal rates at lower concentrations than other aluminum oxide powders of comparable particle size.

The nominal crystal size of the colloidal aluminum oxide is approximately 10 to 10,000 Å). Colloidal alumina-coated silica is an alternative to pure colloidal alumina. As used herein, the term "colloidal aluminum oxide" is intended to include both pure colloidal aluminum oxide as well as alumina-coated particles of colloidal size. The concentration of colloidal aluminum oxide in the dispersion is in the range of about 5% to 10% by volume, preferably about 6% to 8% by volume.

In addition to the aluminum oxide powder and the colloidal aluminum oxide, the suspension also preferably contains a minor amount, usually 0.5% to 1.5% by volume, of a suspending agent (surfactant). Distilled water is a preferred aqueous suspending medium. The pH of the suspension will usually be acid, typically about 4 to 6, preferably about 5 to 6. The suspension can be caused to thicken by adding a thickening agent such as hydroxypropyl methyl cellulose and raising its pH to approximately 7.

The nickel-coated disc substrates are polished with the above-described composition by subjecting the surface to mechanical rubbing (polishing) in the presence of the composition. The mechanical rubbing or polishing is conveniently effected by contacting the metal surface with a polishing pad under a predetermined compressive force with relative motion between the pad and the surface. The resulting dynamic friction between the pad and the surface causes the desired wear and smoothing of the surface. The relative motion is preferably achieved through rotation of either or both the surface and the pad. Preferably, the subtrate is held in a manner in which it can rotate passively. Commercially available polishing pads that are used to polish glass or wafers in the electronics industry may be used. These pads are typically composed of a microporous polymer such as polyurethane foam, optionally backed with a substrate such as felt, latex-filled felt, dense polyurethane, or latex.

The polishing machines that are used to polish silicon wafers and the like in the electronics industry may be adapted for use in polishing the nickel-coated magnetic disc substrate. These machines basically consist of a pair of platens. One of the platens carries a rack on which one or more discs may be mounted. The other platen carries a driven rotatable plate on which the polishing pad is mounted. The machine includes means for controlling the pressure between the platens, means for controlling the temperature of the platens, and means for injecting fluid into the interface between the platens. The preferred mode for practicing the invention process employs such a machine.

In this preferred mode the nickel-coated disc substrates are mounted on one platen and the desired polishing pad on the other. The platens are brought together while the polishing pad is rotated, typically at about 40 to 80 rpm, more usually about 55 to 65 rpm. The polishing composition of the invention is simultaneously applied to the interface via the fluid injecting means. The pressure between the platens is usually in the range of 50 to 300 psi head-platen pressure (0.50 to 3.0 material pressure, pounds per square inch), more usually 50 to 100 psi head-platen pressure (0.50 to 1.0 material pressure, pounds per square inch). The duration of polishing will usually be in the range of 1 to 10 min, more usually 4 to 6 min, per side of the disc substrate. The temperature is maintained in a range of about 10° C. to about 45° C., preferably about 25° C. to about 35° C., during the polishing operation. When the polishing is completed the platens are separated and the polished substrates are removed and rinsed with water. The discs may then be subjected to various post-polishing steps such as texturing and application of a ferromagnetic layer.

The following example further illustrates the composition and process. This example is not intended to limit the invention in any manner.

A suspension of $Al_2O_3$ powder and colloidal aluminum oxide was made using the following recipe.

| Ingredient | Amount | Vol % | Wt % |
|---|---|---|---|
| distilled $H_2O$ | 250 gal | 92.1 | |
| suspending agent, EverFlow | 3 gal | 1.3 | |
| alumina-coated silica sol (Nalco ISJ-612) | 15 gal | 6.6 | |
| $Al_2O_3$ (Rhodes, untreated 3-5 micron nominal crystal size) | 60 lb | | 2.95 |

This suspension was prepared by adding the suspending agent to the distilled water followed by the addition of the alumina-coated silica gel with mixing. After the silica sol was thoroughly mixed, the aluminum oxide powder was added. The final pH of the suspension was 5.0, and its specific gravity was 1.0202.

This suspension is stored separately in a holding vessel equipped with a stirrer. The vessel is connected to the valving of a polishing machine standard in commerce, as described herein. The machine is equipped with platen temperature controllers, set in the range of 25° C. to 35° C.

Electroless Ni-plated 5¼-inch disc substrates (aluminum base) were mounted on carriers and the carriers were mounted on the head platen of the polish machine. The base platen of the polish machine carried an Ultrafol I polishing pad rotating at approximately 65 rpm. The machine is equipped with an aqueous suspension feed line located at the midpoint of the polishing pad on the base platen. The suspension was fed through the line at a flow rate of 18 gph. Head-platen pressures were as follows:

| | |
|---|---|
| high | 100 psi |
| low | 50 psi |

The polish procedure comprised three cycles as follows:

cycle 1: low head pressure, 15 sec
cycle 2: high head pressure, 1 min
cycle 3: rinse, low head pressure, 30 sec The removal rate using this polishing procedure is 100 microinches per minute.

After one side of the nickel-coated substrates is polished, they were turned over and their other sides were polished as above.

Based on tests of this new polishing process, its benefits as compared to the process of U.S. Pat. No. 4,475,981 include the following:

removal rate approximately 10 times faster
one-step process
decreased polishing pad usage
significant overall yield improvement
shorter duration—increased machine productivity While the composition and process of the invention are particularly suited to polishing the working surfaces of nickel- or nickel alloy-coated substrates for rigid magnetic discs, they may be used to polish other nickel surfaces or surfaces of other metals that are susceptible to mechanical polishing.

Modifications of the above-described modes for carrying out the invention that are obvious to those of skill in the fields of chemistry, metal polishing, recording media, and related fields are intended to be within the scope of the following claims.

I claim:

1. A composition for polishing a metal surface comprising an aqueous suspension of:
   (a) unlubricated aluminum oxide powder having a hexagonal crystal shape and a nominal particle size in the range of 1 to 10 microns; and
   (b) colloidal aluminum oxide.

2. The composition of claim 1 wherein the metal surface is the surface of a nickel- or nickel alloy-coated substrate for a rigid magnetic disc.

3. The composition of claim 2 wherein the concentration of aluminum oxide powder in the suspension is about 1% to about 5% by volume and the concentration of colloidal aluminum oxide in the suspension is about 5% to 10% by volume, and the nominal particle size of the aluminum oxide powder is in the range of 3 to 5 microns.

4. The composition of claim 1 wherein the concentration of aluminum oxide powder in the suspension is about 2% to 4% by volume and the concentration of colloidal aluminum oxide in the suspension is about 6% to about 8% by volume, and the nominal particle size of the aluminum oxide powder is in the range of 3 to 5 microns.

5. The composition of claim 1 wherein the aqueous suspension also contains a suspending agent.

6. The composition of claim 4 wherein the aqueous suspension also contain a suspending agent.

7. A process for polishing a metal surface comprising:
   (a) mechanically rubbing the surface while
   (b) contacting the surface with the composition of claim 1.

8. A process for polishing a surface of a nickel- or nickel alloy-coated rigid magnetic disc substrate comprising:
   (a) mechanically rubbing the surface while
   (b) contacting the surface with the composition of claim 3.

9. A process for polishing a surface of a nickel- or nickel alloy-coated rigid magnetic disc substrate comprising:
   (a) mechanically rubbing the surface while
   (b) contacting the surface with the composition of claim 4.

10. A process for polishing a surface of a nickel- or nickel alloy-coated rigid magnetic disc substrate comprising:
   (a) mechanically rubbing the surface while
   (b) contacting the surface with the composition of claim 5.

11. A process for polishing a surface of a nickel- or nickel alloy-coated rigid magnetic disc substrate comprising:
   (a) mechanically rubbing the surface while
   (b) contacting the surface with the composition of claim 6.

* * * * *